UNITED STATES PATENT OFFICE.

FRANK R. ELDRED, FRANCIS E. BIBBINS, AND RAY N. REED, OF INDIANAPOLIS, INDIANA, ASSIGNORS TO THE ELI LILLY AND COMPANY, OF INDIANAPOLIS, INDIANA, A CORPORATION OF INDIANA.

COCA EXTRACT AND PROCESS OF PRODUCING SAME.

1,218,536. Specification of Letters Patent. Patented Mar. 6, 1917.

No Drawing. Application filed December 11, 1916. Serial No. 136,309.

*To all whom it may concern:*

Be it known that we, FRANK R. ELDRED, FRANCIS E. BIBBINS, and RAY N. REED, citizens of the United States, residing at Indianapolis, Marion county, and State of Indiana, have invented and discovered certain new and useful Improvements in Coca Extracts and Processes of Producing Same, of which the following is a specification.

Our invention relates to coca extracts and processes of producing same. Its objects are to produce a coca extract which shall be free from substances injurious to health and to provide a method for attaining this end, which shall be effective in entirely ridding the coca of the harmful substances by a series of steps which are few in number and readily carried out. The invention also contemplates the preparation of such coca product in a form which shall retain the aromatic properties of the coca.

With these objects and others in view, our invention is embodied in the article and process hereinafter described.

The attempts which have been made to prepare from coca leaves an extract containing the characteristic aromatic constituents and at the same time free from cocain and other coca bases, such as ecgonin and benzoyl ecgonin have hitherto been unsuccessful, owing to the fact that although the cocain could be removed, the other bases could not be completely removed and moreover, most of the aromatic constituents were lost in the process of removing the cocain. Such extracts have also frequently been contaminated by traces of the solvents used for removing the cocain. We have succeeded in preparing a liquid extract of coca leaves free from cocain, ecgonin, benzoyl ecgonin and other coca bases and at the same time retaining all of the characteristic aromatic properties of coca leaves. The preparation of the extract may be carried out as follows:—

Coca leaves are ground and percolated with a suitable menstruum, preferably 20% alcohol. When the leaves have been completely extracted, the alcohol, when a hydroalcoholic menstruum is used, is distilled off from the percolate, carrying with it most of the aromatic constituents of the coca leaves. The aqueous extract is then concentrated, preferably by evaporation, to dryness and the dry residue is ground in a mill with successive portions of alcohol which remove most of the cocain together with all of the other coca bases. Instead of evaporating the extract completely to dryness, the same may be merely concentrated to a syrupy or viscous condition and then treated with the alcohol.

The alcohol is removed from the residue and the latter is dissolved in water; this solution is treated with one or more portions of an adsorbing agent, for example, hydrated aluminum or other natural earth silicate, such as fullers' earth, which remove all of the cocain not removed by the alcohol. The solution is filtered off from the adsorbing agent and the alcohol carrying most of the aromatic constituents of the drug is then added. The proportion of coca leaves used in making the extract may be varied so that an extract of any desired concentration can be prepared.

It is clear that certain steps of the process may be employed to produce useful results without making use of the other steps. Thus, if it is not desired to obtain a product which possesses the aromatic properties of coca, but merely one in which all the harmful bases are removed, then the step of adding the alcohol originally distilled off from the extract and containing the aromatic constituents, may be dispensed with and the remaining steps of the process employed to produce a product which is free from the harmful alkaloids.

Also the order of the steps of the process above defined may be changed without departing from our invention. Thus, instead of removing the ecgonin and benzoyl ecgonin by the use of the alcohol or other solvent, before the final separation of the cocain, the entire cocain constituent may first be removed by the use of the fullers' earth or other adsorbing agent and then the step of removing the ecgonin and benzoyl ecgonin employed.

It is evident that the step of removing the ecgonin and benzoyl ecgonin by the solvent may be employed in combination with some other specific cocain removing medium than the adsorbing agent. For instance, chloroform or benzol which are well known solvents for cocain might be employed in lieu of the fullers' earth or similar adsorbing means in such broad combination.

Having thus described our invention, what we claim is:

1. As a new article of manufacture, an extract of coca leaves free from cocain and the other alkaloids present in coca.

2. As a new article of manufacture, an extract of coca leaves retaining the characteristic flavor or aroma and free from cocain and the other bases present in coca.

3. As a new article of manufacture, a liquid extract of coca leaves retaining the characteristic flavor or aroma and free from cocain and the other bases present in coca.

4. As a new article of manufacture, an extract of coca leaves free from cocain and ecgonin and benzoyl ecgonin originally present in the coca leaves.

5. As a new article of manufacture, a liquid extract of coca leaves possessing the characteristic flavor or aroma of the original leaves and free from the cocain and the ecgonin and benzoyl ecgonin.

6. The process of preparing an extract of coca leaves which consists in extracting the leaves with a solvent, concentrating the solution, treating the concentrated extract with solvents to remove the ecgonin and benzoyl ecgonin and then treating the remaining portion of the extract with a cocain-removing agent.

7. The process of preparing an extract of coca leaves which consists in extracting the leaves with a solvent, concentrating the solution, treating the concentrated extract with alcohol to remove the ecgonin and benzoyl ecgonin, dissolving in water the portion not dissolved in the alcohol and then treating the last solution by a cocain removing agent.

8. The process of preparing an extract of coca leaves which consists in extracting the leaves with a hydro-alcoholic menstruum, distilling off the alcohol, concentrating the resulting aqueous solution, treating the concentrated extract with alcohol to remove ecgonin and benzoyl ecgonin, dissolving in water the part of the extract not dissolved in the alcohol, and treating this solution by a cocain removing agent.

9. The process of preparing an extract of coca leaves which consists in extracting the leaves with a hydro-alcoholic menstruum, distilling off the alcohol, concentrating the resulting aqueous solution, treating the concentrated extract with a solvent to remove ecgonin and benzoyl ecgonin, dissolving the undissolved portion in water, removing the remaining portion of cocain by any suitable means and adding the alcohol originally distilled off.

10. The process of extracting coca leaves which includes the steps of treating the extract with a solvent such as alcohol to remove the ecgonin and benzoyl ecgonin and of treating the extract with an adsorbing agent to remove the cocain.

11. The process of preparing an extract of coca leaves which consists in extracting the leaves with a hydro-alcoholic menstruum, distilling off the alcohol, concentrating the resulting aqueous solution, treating the concentrated extract with a solvent, such as alcohol, to remove ecgonin and benzoyl ecgonin, dissolving the undissolved portion in water and removing the remaining portion of cocain by treating the aqueous solution with one or more portions of a substance which will adsorb the cocain.

12. The process of preparing an extract of coca leaves which consists in extracting the leaves with a hydro-alcoholic menstruum, distilling off the alcohol, concentrating the resulting aqueous solution, treating the concentrated extract with alcohol or other suitable solvents to remove ecgonin and benzoyl ecgonin, dissolving the undissolved part in water, removing the remaining portion of cocain by treating the aqueous solution with one or more portions of an adsorbing agent and adding the alcohol which was originally distilled off.

13. In the process of extracting coca leaves, the steps of treating an extract from the leaves with a solvent, such as alcohol, to remove the ecgonin and benzoyl ecgonin, and with fullers' earth to remove cocain.

14. In the process of extracting coca leaves, the steps of treating an extract of said leaves with a solvent such as alcohol to remove the ecgonin, benzoyl ecgonin, and a part of the cocain, and then treating the extract with fullers' earth to remove the remaining cocain.

15. The process of preparing an extract of coca leaves which consists in extracting the leaves with a hydro-alcoholic menstruum, distilling off the alcohol, concentrating the resulting aqueous solution, treating the concentrated extract with alcohol to remove ecgonin and benzoyl ecgonin, dissolving the undissolved part in water and removing the remaining portion of cocain by treating the aqueous solution with one or more portions of fullers' earth.

16. The process of preparing an extract of coca leaves which consists in extracting the leaves with a hydro-alcoholic menstruum, distilling off the alcohol, concentrating the resulting aqueous solution, treating the concentrated extract with a solvent, such as alcohol, to remove ecgonin and benzoyl ecgonin, dissolving the undissolved part in water and removing the remaining portion of cocain by treating the aqueous solution with one or more portions of hydrated aluminum silicate.

In witness whereof, we have hereunto set our hands and seals at Indianapolis, Indiana, this seventh day of December, A. D. nineteen hundred and sixteen.

FRANK R. ELDRED. [L. S.]
FRANCIS E. BIBBINS.
RAY N. REED. [L. S.]

Witnesses:
E. G. EBERHARDT,
M. K. PRUYN.